Patented May 16, 1939

2,158,239

UNITED STATES PATENT OFFICE 2,158,239

ACRYLATES

William A. Lott, East Orange, N. J., assignor to E. R. Squibb & Sons, New York, N. Y., a corporation of New York No Drawing. Original application September 12, 1933, Serial No. 689,158. Divided and this application May 8, 1937, Serial No. 141,567

3 Claims. (Cl. 260—477)

This application is a division of application Serial No. 689,158 filed September 12, 1933, which has matured into Patent 2,103,265, dated Dec. 28, 1937.

This invention relates to, and has for its object the provision of, certain acrylates.

The compounds of this invention are those having the general formula X,Y-amino-alkyl α-R β-Z acrylate wherein X represents alkyl, Y represents one of the radicals alkyl and aralkyl, R represents one of the radicals alkyl and phenyl, and Z represents one of the radicals alkyl, phenyl, halophenyl, and dialkylamino-phenyl; and the salts thereof. These compounds, which are characterized by valuable local-anesthetic properties, may be prepared by causing the appropriate acyl chloride to react with the appropriate alcohol or by causing the sodium salt of the appropriate acid to react with the appropriate alkyl chloride.

Examples

1. Diethylaminoethyl (α-amyl) cinnamate hydrochloride. A solution of 12 g. of α-amyl cinnamic acid in 25 cc. of absolute alcohol is added to a solution of 2.5 g. of sodium in 30 cc. of absolute alcohol; to the clear solution of the sodium salt thus formed, a solution of 9.5 g. of diethylaminoethyl chloride hydrochloride in 20 cc. of absolute alcohol is added, and the reaction mixture is boiled under reflux for 2 hours; the sodium chloride separated during refluxing is removed by filtration, the solution is concentrated to about 20 cc., and sufficient anhydrous ether solution of hydrochloric acid is added to precipitate the amino ester hydrochloride; the gelatinous precipitate separated is dissolved in water and alkalinized, the free base of the amino ester is extracted with ether, the ethereal solution is dried over fused potassium carbonate and treated with an equivalent quantity of a solution of hydrochloric acid in ether; and the gelatinous mass separated is dissolved in water and dried under vacuum over phosphorus pentoxide, yielding the compound sought as a hygroscopic white granular substance freely soluble in water and in warm benzene.

2. Diethylaminoethyl (α-methyl) cinnamate hydrochloride. 8.2 g. of diethylamino ethanol dissolved in 30 cc. anhydrous ether is refluxed for an hour with a solution of 16.8 g. of methyl cinnamyl chloride in 50 cc. of anhydrous ether; after cooling, the crystalline product, which is the compound sought, is separated by filtration and recrystallized from a mixture of absolute alcohol and ether, giving fine white crystals melting at 133–134.5° C.

3. Diethylaminoethyl (α-butyl) cinnamate hydrochloride. 16.3 g. of α-butyl cinnamic acid is dissolved in 30 cc. absolute alcohol and added to a solution of 2.9 g. of sodium in 100 cc. of absolute alcohol; 8.6 g. of diethylaminoethyl chloride hydrochloride dissolved in 20 cc. of absolute alcohol is added; the solution is refluxed four hours on an oil bath; the sodium chloride separated is removed by filtration; the alcohol is concentrated to 25 cc.; an anhydrous ethereal solution of hydrogen chloride is added in very slight excess; the compound sought separates out in the crystalline state; recrystallization from dry acetone yields it in the form of white crystals melting at 105.5–106.5° C.

4. Dibutylaminopropyl (α-ethyl) cinnamate hydrochloride. 15.2 g. of α-ethyl cinnamic acid dissolved in 20 cc. of absolute alcohol is added to a solution of 1.9 g. of sodium dissolved in 25 cc. of absolute alcohol; the mixture is refluxed for two hours; the sodium chloride separated is removed by filtration; the alcohol solution is concentrated almost to dryness and diluted with ether; unreacted sodium alpha ethyl cinnamate is removed by filtration; the solution is treated with an excess of ethereal hydrogen chloride and extracted with water; the extract is alkalinized, and extracted with ether; the ether solution is thoroughly dried by means of anhydrous potassium carbonate; and by the addition of ethereal hydrogen chloride to the filtered ether solution, the compound sought is precipitated as a sirupy non-crystallizing substance, of which an approximately 2% aqueous solution can be prepared.

5. Diethylaminoethyl (α-phenyl β-propyl) acrylate hydrochloride. 8.8 g. of α-phenyl β-propyl acrylic chloride in 20 cc. of dry benzol is added to 3.9 g. of diethylaminoethyl alcohol in 25 cc. of benzol, and the mixture is refluxed two hours; the solution is concentrated, diluted with ether, and extracted with acidulated water; the aqueous solution is alkalinized and extracted with ether; the ether solution is dried with potassium carbonate, filtered, and treated with a very slight excess of ethereal hydrogen chloride; and the compound sought separates as a noncrystallizing sirupy mass.

6. Diethylaminoethyl (α-ethyl) o-chloro cinnamate hydrochloride. 14.0 g. of α-ethyl o-chloro cinnamyl chloride is refluxed about six hours with 5.4 g. of diethylaminoethyl alcohol in about 75 cc. of anhydrous benzol, the crystals first formed later redissolving; the solution being allowed to stand, the compound sought crystallizes out, and after separation by filtration, washing with benzol, and several recrystallizations from dry acetone, is obtained in the form of fine white crystals melting at 127.5–128° C.

7. Diethylaminoethyl (α-ethyl) p-dimethylamino cinnamate hydrochloride. 1.92 g. of metallic sodium is dissolved in 50 cc. of absolute alcohol; 18.4 g. of α-ethyl p-dimethylamino cinnamic acid dissolved in 100 cc. of absolute alcohol is added; the mixture is refluxed for an hour; a solution of diethylamino ethyl chloride is added; the mixture is refluxed for five hours; the sodium chloride is removed by filtration and the alcohol is distilled off; the remaining 30 cc. is diluted with 30 cc. of anhydrous ether; ethereal hydrogen chloride being added in a slight excess, the compound sought precipitates as pale-yellow crystals which, after recrystallization from acetone containing 1% absolute alcohol and drying, melt at 170° to 171° C.

Below are listed further exemplificative compositions, which may be prepared by such processes as are described in the foregoing examples:

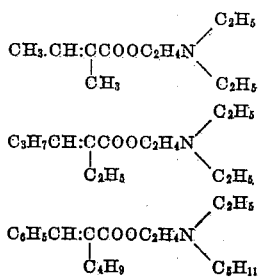

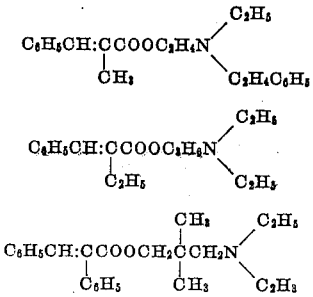

It is to be understood that the foregoing examples are merely illustrative and by no means limitative of the invention, which may be variously otherwise embodied—as with respect to particular compositions and processes—within the scope of the appended claims.

I claim:

1. Compounds having the general formula X,Y-amino-alkyl α-R cinnamate wherein R, X, and Y represent alkyls at least one of which has at least four carbon atoms; and the inorganic salts thereof.

2. Diethylaminoethyl (α-amyl) cinnamate hydrochloride.

3. Dibutylaminopropyl (α-ethyl) cinnamate hydrochloride.

WILLIAM A. LOTT.